April 8, 1952     A. J. MILLA     2,591,851
AGRICULTURAL IMPLEMENT
Filed Nov. 9, 1949
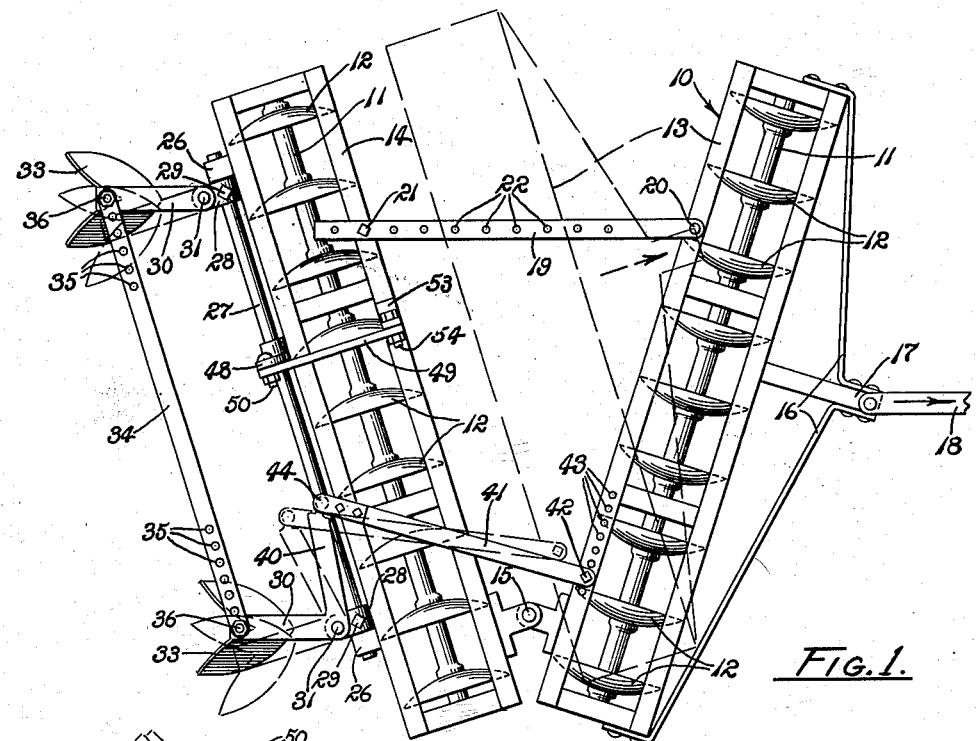
ALFORD J. MILLA
INVENTOR
HUEBNER, BEEHLER, WORREL
HERZIG & CALDWELL
ATTORNEYS
BY Richard M. Worrel Patented Apr. 8, 1952

2,591,851

UNITED STATES PATENT OFFICE 2,591,851

AGRICULTURAL IMPLEMENT

Alford J. Milla, Fresno, Calif.

Application November 9, 1949, Serial No. 126,286

7 Claims. (Cl. 97—4)

This invention relates generally to agricultural implements and more particularly to a combined disc harrow and cultivator in which adjustment of the disc harrow automatically adjusts the cultivator in relation to line of draft.

Conventionally the harrowing or plowing and furrowing of soil in preparation for irrigation are separate and distinct operations. The harrowing or plowing is necessarily completed before the furrowing is started. By combining the operations, the cost is appreciably reduced by the time saved and the saving in the amount of fuel required to operate the tractor to pull the implements. The simple interconnection of a disc harrow and a furrowing apparatus in tandem arrangement does not accomplish the desired results in that the guiding, adjusting, and control peculiarities of such implements have heretofore precluded such joint operation.

Therefore it is an object of the present invention to provide an improved combined disc harrow and furrowing or cultivating implement.

Another object is to provide an improved means for mounting a furrower anterior of a disc harrow or the like for combined operation and control.

Another object is to provide a combined disc harrow, employing angularly adjustable gangs of discs, and furrowing or cultivating apparatus in which said apparatus is guided in earth traversing attitude in response to angular adjustment of the gangs.

Another object is to mount a furrowing apparatus on a disc harrow in closely coupled tandem relation in controlled association whereby the furrowing apparatus properly follows the harrow in making turns.

Another object is to provide means for mounting a furrowing apparatus rearwardly of an implement in draft relation thereto conveniently adjustable between operable and inoperable attitudes.

A still further object is to provide mounting means of the character described for conveniently adjusting the lateral spacing and location of individual furrowing shovels.

Still further objects and advantages will become apparent in the subsequent description in the specification.

In the drawing:

Fig. 1 is a plan view of a disc harrow and furrowing apparatus mounted thereon illustrating the present invention.

Fig. 2 is a side elevation of the harrow and furrowing apparatus illustrating gangs of the harrow in inwardly folded or pivotal condition, as shown in dashed lines of Fig. 1. This figure also shows in dashed line the furrowing apparatus pivoted upwardly to retracted inoperable position.

Fig. 3 is a somewhat enlarged rear elevation of the rear gange of the disc harrow and the furrowing apparatus mounted thereon.

Referring in greater detail to the drawing:

The numeral 10 designates a disc harrow having a pair of disc assemblies 11 each employing a plurality of discs 12. One of the assemblies is journaled in a forward frame 13 and the other in a rearward frame 14. The frames are pivotally interconnected for horizontal angular adjustment, the frames and their assemblies comprising adjustably angled gangs of discs of popular construction.

A draft hitch 16 is attached to and extends forwardly of the forward frame 13 and mounts a block 17 at the forward end. A draft tongue 18, of a draft appliance such as a tractor (not shown) is releasably pivotally connected to the block 17 to impart forward movement to the disc harrow. The relative angularity of the forward frame 13 and the rearward frame 14 is regulated and maintained by providing an elongated spacing bar 19 pivotally connected at 20 to the forward frame and adjustably connected to the rearward frame 14 by means of a bolt 21 extended through one of a plurality of spaced openings 22 aligned longitudinally of the spacing bar and the rear frame. The disc harrow may be of any desired form provided with angularly adjustable forward and rearward framed gangs of earth working tools angularly adjustable to control cutting efficiency.

A pair of horizontally spaced aligned bearings 26 are secured to the rear side of the rearward frame 14 as by welding. A pinion shaft 27 is journaled in the bearings and mounting blocks 28 are located on the shaft between the bearings 26 for rotation therewith and for adjustable spacing axially of the shaft and locked positioning by means of screws 29 threadedly received in each block for shaft engagement. An arm 30 is pivotally mounted at 31 on a vertical axis at the outer end of each of the mounting blocks 28 and extends rearwardly and downwardly therefrom. Each arm 30 has an integral downwardly and forwardly angled extension 32 to which a shovel 33 or cultivator tool is attached. Each furrowing shovel is substantially conventional or of any suitable design with a pointed forward edge and transversely flared blades. As the shovels are moved forwardly they move the disced soil to both sides of the central pointed edge making a furrow for irrigating or other purposes.

The pair of arms 30 and attached shovels are adapted to pivot simultaneously in parallelism by providing a connecting bar 34 interconnecting the rearward ends of arms. The connecting bar has a plurality of longitudinally spaced and aligned openings 35 formed therethrough adjacent each of its ends and is pivotally connected by arm mounted pins 36 engaging an opening at each end. The plurality of openings permits adjustability of the effective length of the connecting bar to maintain the arms 30 in parallel or other selected relation when the blocks 28 are adjusted longitudinally of the shaft 27 to alter the spacing and location of the shovels 33 relative to the disc harrow 10.

An operating arm 40 is formed integrally with, and substantially at right angles to, one of the shovel supporting arms 30 radially of its pivotal mounting. An elongated actuating bar 41 is pivotally connected at 42 to one of a plurality of openings 43 formed through a portion of the forward frame 13 of the disc harrow 10. The rearward end of the actuating bar is universally connected at 44 to the outer free end of the operating arm 40. By adjustably connecting the forward end of the actuating bar 41 to selected openings 43 in the frame 12, the angularity and amount of pivoting of the shovel supporting arms 30 are regulated in response to adjustment of the angularity of the disc frames 13 and 14.

A lever 48 is secured to the shaft 27 substantially midway between the bearings 26 and extends upwardly therefrom. A link 49 is pivotally connected at 50 to the upper free end of the lever 48. The link 49 has a pair of spaced openings formed therethrough including an outer opening 51 at the forward end and an inner opening 52 substantially midway of its length. A bracket 53 is secured to the disc frame 14 and the link 49 is attached to the bracket by passing a bolt through the bracket and one of the openings 51 and 52. With the bolt through the bracket and opening 51 the shovels 33 are held downwardly in ground engagement for forming furrows on forward movement of the implement. With the bolt 54 through the bracket and the opening 52 the shovels are held upwardly in operable position above the ground, as illustrated in dashed line in Fig. 2 of the drawing.

*Operation*

The operation and utility of the present invention are believed to be apparent and are briefly summarized at this point. In the use of the disc harrow 10 and attached furrowing shovels 33 the draft tongue 18 is connected to a draft appliance and pulled forwardly, or to the right as viewed in Figs. 1 and 2 of the drawing. As in conventional practice, the depth of soil engagement of the individual discs 12 is regulated by the selected angularity of the disc frames 13 and 14. This is accomplished by regulation of the effective lengths of the spacing bar 19 or other suitable structure.

With the shovels 33 mounted to swing on vertical axes in parallelism on the rear frame 14, the shovels are maintained in a forwardly pointed direction regardless of the adjusted relative angularity between the disc frames 13 and 14 by the actuating bar 41. As illustrated in full lines in Fig. 1 of the drawing, the shovels are pointed forwardly in the direction of movement, which is perpendicular to a line bisecting the angle between the frames 13 and 14. As the relative angularity between the disc frames 13 and 14 is altered, the angularity of the shovel supporting arms 30 moving in parallel relation is also altered to maintain the shovels in a position pointed directly forwardly of the direction of movement of the disc harrow.

In observing Fig. 1, it is apparent that reducing the angle between the frames 13 and 14 would have the effect of angling the cultivator shovels 33 to the right, relative to a line of draft, if the shovels were rigidly mounted on the rear frame. However, when such frame angling occurs in the device of the present invention, the actuating bar 41 is moved rearwardly relative to the rear gang, as shown in dashed lines, pivoting the bell crank consisting of one of the arms 30 and the operating arm 40 integral therewith in a clockwise direction, turning the shovels to positions pointed substantially at right angles to a line bisecting the angle between the frames in alignment with the normal direction of movement of the combined disc harrow and furrowing apparatus.

As shown in dashed lines in Fig. 1, when frames 13 and 14 are pivoted to parallel relation for rolling contact with the surface of the ground, the shovels 33 are still positioned to align with the direction of earth traversing movement of the disk harrow. The operation of the operating arm 40 and bar 41 automatically positions the shovels in a forwardly pointed direction at any relative angularity of the disc frames 13 and 14.

During a furrowing operation the shovels are held downwardly in effective position by means of the lever 48 and pivotally connected link 49 with the bolt 54 passing through the bracket 53 and the opening 51 in the link. When it is desired to raise the shovels to inoperable position, the bolt 54 is removed from opening 51, the shovels and supporting arms 30 pivoted upwardly on shaft 27 and the bolt inserted into the opening 52 effectively maintaining the shovels in elevated position, as for transporting.

The lateral spacing of the pair of shovels may be regulated by securing the arms 30 longitudinally of the shaft 27 in the desired position thereon by means of the screws. Whenever the positions of the shovels are changed, the effective length of the connecting bar 34 should also be changed to maintain the arms 30 in parallel or other selected attitude. Whenever the arm 30, having the integral operating arm 40, is adjustably moved longitudinally of the shaft 27, the forward end of the activating bar should be adjusted to the required opening 43 in the forward disc frame 13 to maintain the shovels in operable attitude relative to the line of draft.

Although I have herein shown and described my invention in what I have conceived to be the most practical and preferred embodiment, it is recognized that departures may be made therefrom with the scope of my invention, which is not to be limited to the details disclosed herein, but is to be accorded the full scope of the claims so as to embrace any and all equivalent devices and structures.

I claim:

1. In a disc harrow having a pair of elongated horizontally extending disc frames pivotally interconnected for relative angularity in a common horizontal plane, means for adjusting the relative angularity of the disc frames, and means for imparting earth transversing movement to the disc harrow in a direction generally transversely of the length of the disc frames, one of the frames being forwardly of the other on forward motion of the disc harrow; the combination of a furrowing apparatus comprising a plurality of furrowing shovels pivotally supported on vertical axes rearwardly of the rearward disc frame, and means connected to the forward frame and the shovels for positioning the shovels simultaneously in parallelism with each other and with the direction of movement of the disc harrow.

2. In a disc harrow having a pair of elongated horizontally extending disc frames pivotally interconnected for relative angular adjustment, means for predetermining the angular adjustment of the frames, and means for imparting earth traversing movement to the disc harrow in a direction generally transversely of the length of the disc frames with one of the frames being forwardly of the other in such movement; a furrowing apparatus comprising a plurality of furrowing shovels pivotally mounted on the rearward frame of the disc harrow for horizontal angular adjustment relative thereto, means constraining the shovels to corresponding pivotal movement, and means interconnecting the shovels and the forward disc frame and translating angular adjustment of the frames into responsive directional control of the shovels.

3. In a disc harrow having a pair of horizontally elongated disc frames pivotally interconnected for relative horizontal angular adjustment, means for adjusting the relative angularity of the disc frames, and means for imparting earth transversing movement to the disc harrow in a direction generally transversely of a line bisecting the angular association of the disc frames; a mounting for furrowing apparatus comprising, a pair of arms pivotally mounted in spaced relation on one of said frames and rearwardly extended therefrom, a rigid connecting bar pivotally interconnecting the rearward end of each arm and maintaining the pair of arms in parallel relation, furrowing shovels attached to the arms for earth engagement, and means interconnecting one of the arms and the disc frame opposite to that on which the arms are mounted translating angular adjustment of the frames into responsive directional control of the shovels.

4. In combination with a disc harrow having forward and rearward framed gangs of discs pivotally interconnected for horizontal angular adjustment, a plurality of arms mounted for horizontal pivotal movement on the rearward framed gang and rearwardly extended therefrom, rigid means pivotally interconnecting the arms for corresponding horizontal pivotal movement, earth working tools borne by the arms for earth engagement, an operating arm laterally extended from one of the tool mounting arms, and a rigid bar pivotally interconnecting the operating arm and the forward framed gang at a position laterally removed from the pivotal interconnection of the gangs.

5. The combination of forward and rearward framed gangs of earth working tools pivotally interconnected for horizontal angular adjustment, a draft hitch connected to the forward gang of earth working tools, means for locking the gangs in predetermined angular adjustment, a shaft journaled on the rearward gang substantially longitudinally parallel thereto, an arm mounted on the shaft for horizontal pivotal movement and rearwardly extended therefrom, an earth working tool mounted on the arm, an operating arm integral with the tool mounting arm radially extended from the pivotal mounting thereof, and a rigid actuating bar pivotally connected to the radially extended end of the actuating arm and the forward gang at a position removed from the pivotal interconnection of the gangs.

6. The combination of forward and rearward framed gangs of earth working tools pivotally interconnected for horizontal angular adjustment, a draft hitch connected to the forward gang of earth working tools, a substantially horizontal shaft journaled on the rearward gang substantially longitudinally parallel thereto, a plurality of arms mounted on the shaft for pivotal movement longitudinally thereof and rearwardly extended therefrom, a bar interconnecting the extended end of the arms in predetermined spaced relation, an operating arm rigidly extended laterally from one of the mounting arms radially of its pivotal mounting, and a rigid actuating arm pivotally connected to the forward gang at a position laterally removed from the pivotal interconnection of the gangs in the direction of the radial extension of the operating arm and connected to the radially extended end of the operating arm for universal movement relative thereto.

7. In a disc harrow having forward and rearward framed gangs of disc blades pivotally interconnected for horizontal angular adjustment, and means interconnecting the gangs in selected angular adjustment, the combination of a rock shaft rotatably mounted on the rearward gang in substantially horizontal position, a lever radially upwardly extended from the rock shaft, means interconnecting the upwardly extended end of the lever and a portion of the rearward gang in adjustably spaced relation whereby rotatable positioning of the rock shaft is adjustably determined, a plurality of mounting arms pivotally mounted on the rock shaft for movement about substantially erect axes and rearwardly extended therefrom, earthworking tools connected to the mounting arms, a bar pivotally interconnecting the rearwardly extended ends of the arms in predetermined spaced relation, an operating arm rigidly extended laterally from one of the mounting arms radially of its pivotal mounting, and a rigid actuating arm pivotally connected to the forward gang at a position laterally removed from the pivotal interconnection of the gangs in the direction of the radial extension of the operating arm and connected to the radially extended end of the operating arm for universal movement relative thereto.

ALFORD J. MILLA.

REFERENCES CITED

The following references are of record in the file of this patent:

UNITED STATES PATENTS

| Number | Name | Date |
|---|---|---|
| 1,431,815 | Kanke | Oct. 10, 1922 |
| 1,948,919 | Johnson | Feb. 27, 1934 |
| 2,035,616 | Pearson | Mar. 31, 1936 |